UNITED STATES PATENT OFFICE.

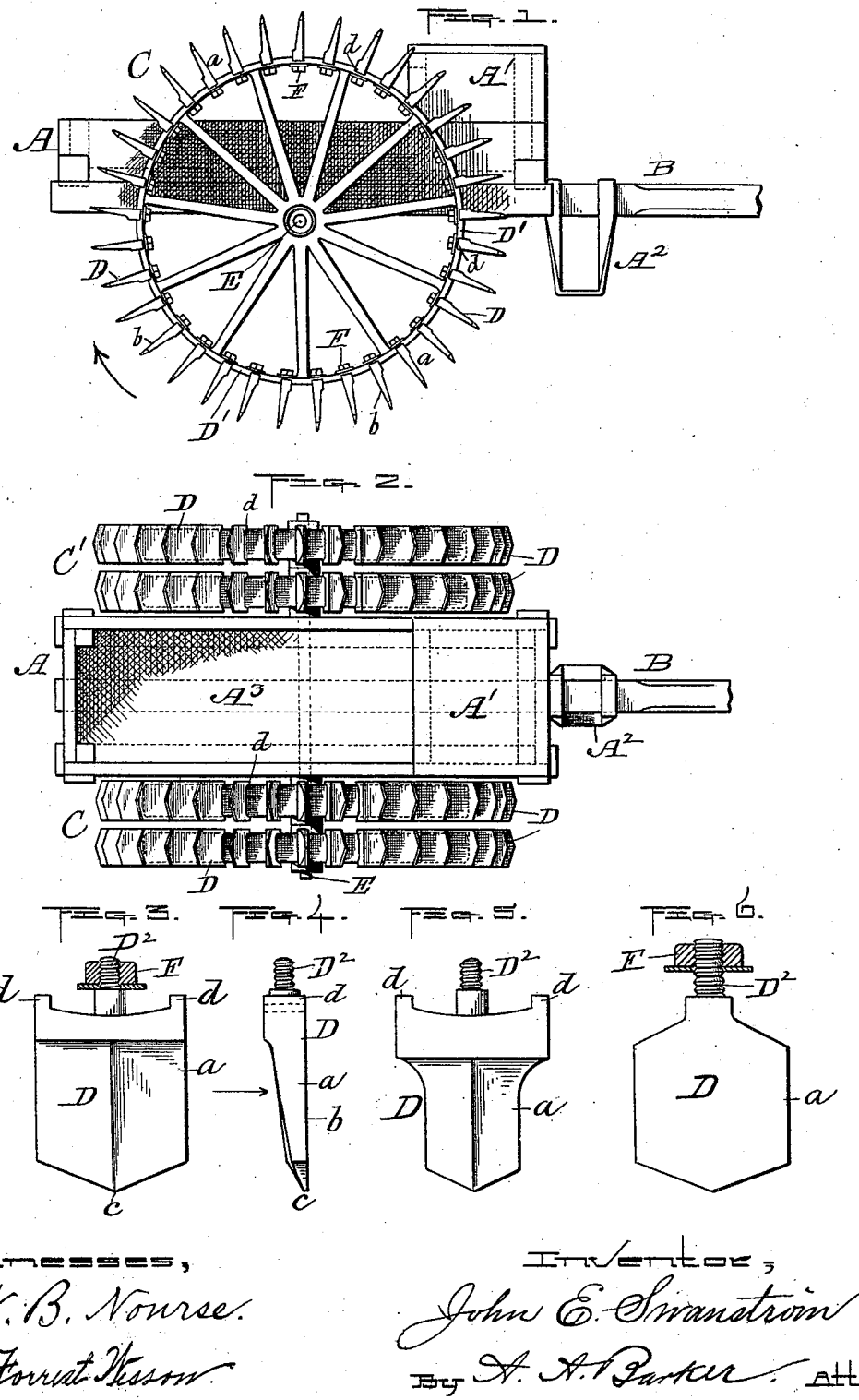

JOHN E. SWANSTRÖM, OF WORCESTER, MASSACHUSETTS.

ROTARY SPADE-PLOW.

SPECIFICATION forming part of Letters Patent No. 577,273, dated February 16, 1897.

Application filed April 15, 1896. Serial No. 587,599. (No model.)

*To all whom it may concern:*

Be it known that I, JOHN E. SWANSTRÖM, of the city and county of Worcester and State of Massachusetts, have invented certain new and useful Improvements in Rotary Spade-Plows; and I do hereby declare that the following is a full, clear, and exact description thereof, reference being had to the accompanying drawings, forming a part of this specification, and in which—

Figure 1 represents a side view of my improved spade-plow with the pole of the plow broken off near the body of said plow. Fig. 2 is a top or plan view of the parts shown in Fig. 1. Figs. 3 and 4 represent a side and edge view, respectively, of one of the spades of my improved plow; and Figs. 5 and 6 show modifications in the construction of said spades which will be hereinafter described.

The object of my invention is to produce a plow whereby the ground may be turned up and broken to the usual depth in an easier and more perfect manner than by the use of the old-style draft-plows commonly employed for that purpose.

Said invention consists of a two-wheeled vehicle having a body adapted to carry stone or other heavy material to weight it down, and whose wheels are each provided with a series of transversely-arranged rigidly-secured spades, projecting radially from the peripheries thereof at a short distance apart, and adapted to enter the ground and turn up and break the turf by the rotation of the wheels in drawing the plow forward, as will be hereinafter more fully set forth.

In order that others may better understand the nature and purpose of my said invention, I will now proceed to describe it more in detail.

Referring to the drawings, A represents the body of the plow, B part of its pole, and C C' the wheels thereof, to which are attached the spades D previously alluded to. Said body A is provided with a seat A' for the plowman to sit upon in driving, and preferably with a step $A^2$, whereby he may easily ascend to said seat. It is also provided with a receptacle $A^3$, which may be filled with stones or other heavy substances for weighting down the plow, so that its spades will penetrate the ground to the proper depth in plowing.

The wheels C C' are preferably made double, as is shown in Fig. 2, that is, with two parallel wheels placed at a short distance apart and with a separate set of spades for each wheel, but I do not limit myself thereto, as a single wheel may be used on each side with substantially the same result, the only difference being that a narrower furrow would thereby be produced than by the use of the double wheels, as shown. Said wheels C C' are mounted and fitted to turn on an ordinary axle E and are each provided with the series of transversely-arranged spades D, in this instance thirty-three to each wheel, but I do not limit myself to this number. Said spades project radially from the peripheries of the wheels, being rigidly secured to the rims D' thereof by passing their threaded ends $D^2$ through suitable openings in said rims and turning nuts F over the inner ends thereof against the inner sides of said rims, as is shown in Fig. 1. The construction of one of said spades is shown upon a larger scale by Figs. 3 and 4.

The body portion $a$, as will be observed, is made somewhat in the form of an ordinary hand-spade for tilling the ground, being of flat shape, as is shown by the edge view, Fig. 4, but considerably thicker than a hand-spade, owing to the greater strain which is liable to be brought upon it in plowing with a plow of this nature.

That side $b$ of each spade which bears and presses against the ground in turning it up by the rotation of the wheel is made substantially flat, as is shown in Fig. 4, while its opposite side is preferably beveled, both laterally and longitudinally, toward the end $c$, which penetrates the ground, and said end is also pointed by beveling the same more or less from the center each way, as is shown in Figs. 2 and 3. By thus forming the spades it is obvious that when the wheels C C' are rotated by drawing the plow forward said spades will readily enter the ground, even though it may be of such a nature as to offer considerable resistance to the usual draft-plow.

The spades may be held from turning in their bearings in the rims, when fastened thereto, by means of ears $d$ $d$, formed upon each side thereof, adapted to fit over the edges of the wheel-rim, as is shown in Fig. 2.

Although I prefer the shape of spades hereinbefore specified, I do not limit myself thereto, as other forms may be employed to accomplish substantially the same result without departing from the principle of my invention.

Two other shapes are shown in Figs. 5 and 6 of the drawings. The one shown by Fig. 5 is substantially the same as that shown in the previous figures, except that the blade is made narrower than in said former instance, while the spade shown in Fig. 6 is modified in the construction by dispensing with the holding-ears $d\ d$ above described.

In operation, as the plow is drawn forward and the wheels are turned in the direction indicated in Fig. 1, each successive spade in advance of or in front of each wheel as it comes in contact with the ground gradually penetrates it until the full depth to which it enters is attained under the center of said wheels. Upon passing by said central point each successive spade commences to exert a backward and upward pressure against the ground, and each, lifting its share, throws or turns it over to the depth that said spades have penetrated, the operation, as will be seen, being somewhat similar to that of spading by foot-pressure by the use of an ordinary hand-spade.

As each spade turns up the ground in advance of each successive one and thus opens a space in front of it the resistance which each spade exerts in performing its work is comparatively small, and therefore comparatively little power is required to draw the plow forward, while at the same time the ground is very thoroughly loosened and broken up by the operation, the result produced being, as previously stated, very similar to that produced by hand-spading.

Having described my invention, what I claim as new, and desire to secure by Letters Patent, is—

In a rotary spade-plow, the combination of the wheels $C\ C'$, with the transversely-arranged spades D adapted to fit the rims of the wheels and having ears $d\ d$ at each side to fit over the edges of the peripheries of the wheels, and means for rigidly fastening said spades to said peripheries of the wheels, substantially as and for the purpose set forth.

JOHN E. SWANSTRÖM.

Witnesses:
A. A. BARKER,
W. B. NOURSE.